Aug. 15, 1933.  F. W. SUNDBLAD  1,922,987
CHARGING APPARATUS FOR OPEN HEARTH FURNACES
Filed Nov. 16, 1932
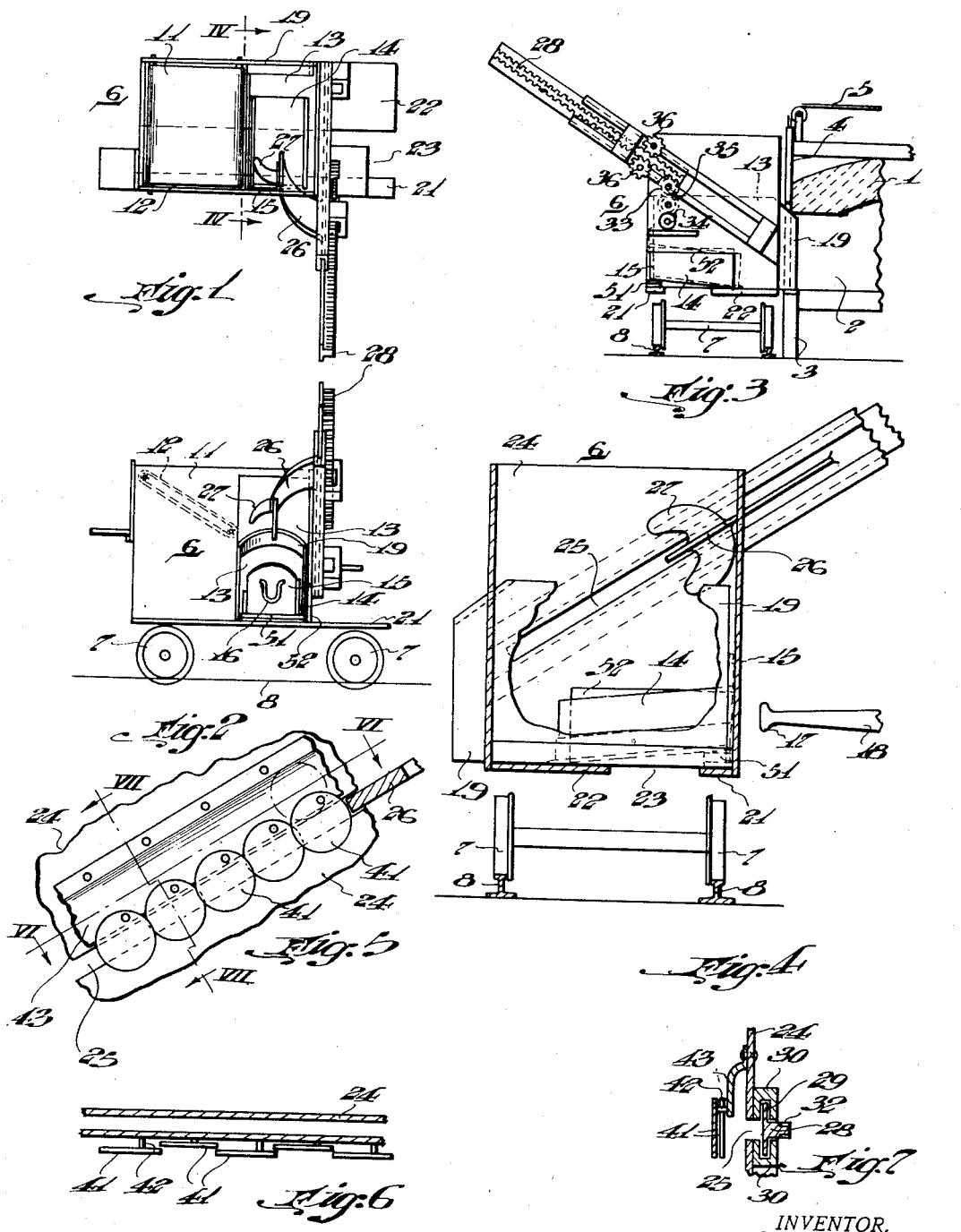
INVENTOR.
Folke W. Sundblad.
BY
ATTORNEY.

Patented Aug. 15, 1933

1,922,987

UNITED STATES PATENT OFFICE 1,922,987

CHARGING APPARATUS FOR OPEN-HEARTH FURNACES

Folke W. Sundblad, Colorado Springs, Colo.

Application November 16, 1932
Serial No. 642,863

6 Claims. (Cl. 214—26)

My invention relates to the charging of open-hearth furnaces and more particularly to the charging of open-hearth furnaces with scrap metal.

As is well known, tremendous quantities of scrap metal are available in this country, and present a splendid opportunity for low-cost steel production, provided methods of an apparatus for handling and charging the same can be developed. Present methods of and apparatus for charging open-hearth furnaces are, however, ill adapted to the handling of scrap metal, the relative lightness and large bulk of which require improved charging methods and apparatus capable of handling such material with sufficient rapidity to warrant its use. Present charging methods and apparatus were developed for the handling of heavy material of small bulk, and are not entirely suitable for the handling and charging of light and bulky scrap metal.

It is therefore the general object of my present invention to provide apparatus for charging open-hearth furnaces with scrap metal in a rapid and efficacious manner, but my invention has for further objects such additional operative advantages and improvements as may hereinafter be found to obtain.

My invention contemplates the provision of a charging car adapted to be positioned in front of the charging door of an open-hearth furnace, and preferably adapted to be moved from one to another of the charging doors of a furnace or a battery of furnaces.

This car is provided with means for receiving scrap metal, such as a hopper or a conveyor, and with a recess adapted to receive a charging box or scoop.

Metal scrap received in the hopper or on the conveyor is transferred to the charging box within the recess, to be delivered at a later time to the furnace.

I further provide a movable member or arm mounted on the charging car at a point immediately above the recess, and adapted to be reciprocally moved to thrust excess scrap from the recess through the charging door of the furnace, whereby the actual charging operation may be facilitated and shortened.

The charging box or scoop is adapted to be handled and operated by means of a charging device of conventional and well-known type, for example, as shown in my prior copending application Serial No. 520,262, filed Mar. 5, 1931.

I further provide means for connecting the recess of the charging car with the charging opening of the furnace, and for forming a passageway therethrough to prevent loss of scrap metal or interference with the charging operation, and numerous other specific improvements in construction and detail, as will be apparent from the description hereinbelow.

In order that my invention may be clearly set forth and understood by those skilled in the art, I now describe, with reference to the accompanying drawing forming a part of this specification, a preferred form in which it may be embodied and utilized. In this drawing, Fig. 1 is a plan view of apparatus for charging an open-hearth furnace, constructed in accordance with my invention;

Fig. 2 is a side elevational view of the apparatus shown in Fig. 1;

Fig. 3 is an end elevational view of the apparatus shown in Figs. 1 and 2, including also a portion of a furnace adapted to be charged thereby, shown partly in vertical section;

Fig. 4 is a vertical sectional view of the apparatus shown in Figs. 1, 2 and 3, taken along the line IV—IV of Fig. 1;

Fig. 5 is an elevational view of a portion of a modified form of the apparatus shown in the preceding figures; and Figs. 6 and 7 are sectional views, taken along the lines VI—VI and VII—VII of Fig. 5, respectively.

Similar reference numerals designate similar parts in each of the several views of the drawing.

Referring now to the drawing, there is shown at 1 a portion of an open-hearth furnace having a charging opening 2, of which there are usually a number located in line in the front wall 3 of the furnace. The charging opening 2 is provided with a suitable door 4, which may be lifted by means of a cable 6 and a lifting device (not shown.)

I provide a charging car, indicated generally by the reference numeral 6, mounted by means of a suitable running gear indicated at 7 upon tracks 8 running parallel to the front wall 3 of the furnace or furnaces 1.

The charging car 6 is provided in turn with a receiving compartment 11, the bottom of which is preferably sloping and preferably comprises a movable conveyor 12, adapted to convey material placed within the compartment 11 to a recessed portion 13 of the car 6.

The recessed portion 13 is adapted to receive a charging scoop 14, having a vertical end 15 with a socket 16 adapted to receive the end of 17 of a charging device 18 of conventional type. There is also provided a movable sleeve member 19 which may be moved forward toward the furnace 1 until it provides a side closure for the space between the recessed portion 13 of the car 6 and the charging opening 2 of the furnace 1, or withdrawn into the recessed portion 13 to permit the car 1 to move laterally with respect to the furnace 1.

The scoop 14 and sleeve member 19 when not being moved by the charging device 18, rest upon floor members 21 and 22, so spaced as to leave an opening 23.

One end wall 24 of the car 6 is provided with a diagonally disposed slot 25, adapted to permit reciprocal travel toward and away from the charging opening 2 of a thrusting member 26 having a plurality of fingers 27.

The thrusting device 26 is connected through the slot 25 to a rack member 28 having flanges 29 adapted for reciprocal travel along guides 30 mounted upon the outside of the wall 24 adjacent the slot 25. The teeth 32 of the rack member 28 engage the teeth of a spur gear 33 driven by a motor 34 through suitable gear mechanism 35. Other spur gears 36 may be provided as shown to act as guides for the rack member 28.

For the purpose of providing a cover for the slot 25, I may provide as shown in Figs. 5, 6 and 7, a plurality of overlapping disks 41, freely suspended from pins 42 fastened to a flange 43 which is in turn fastened to the wall 24 above the slot 25. In the natural position which the disks 41 assume under the influence of gravity, they afford a suitable covering and protection for the slot 25, thus preventing scrap metal from entering the latter and obstructing the movement of the thrusting device 26. Nevertheless, as will be apparent from Fig. 5, they do not of themselves offer an obstruction to the travel of the device 26 but on the contrary freely swing about the pins 42, as indicated by the broken lines in Fig. 5, as the device 26 advances and retreats, and maintaining a coverage for the slot 25 on either side of the device 26.

The car 6 may be provided with a suitable motor (not shown) for propelling it along the track 8, and with suitable controlling devices (not shown) for the various motors.

In the operation of my device, scrap metal to be charged into the furnace 1 is delivered to the compartment 11 and after the car 6 is positioned in front of the charging opening 2, the scrap is moved by means of the conveyor 12 into the recessed portion 13.

In the meantime, the operator of the charging machine 18 forces the sleeve 19 toward the furnace 1 until it engages the sides of the car 6 or the charging opening 2, as the case may be.

The thrusting device 26, which has been in its uppermost position, is then operated as many times as is necessary to force scrap lying above the scoop 14 through the charging opening 2 into the furnace 1, and is then withdrawn above the scoop 14.

The recessed portion 13 of the car 6 now having been largely cleared of any scrap except that lying in front of or on the scoop 14, the latter is pushed by means of the charging machine 18 into the furnace 1, where it is overturned to discharge its contents. The scoop 14 is then withdrawn into the recessed portion 13 to receive more scrap from the compartment 11, or it may be, directly from electromagnets or other means employed for the purpose of initially transferring the scrap from a railroad car or the like to the car 6.

The alternate use of the thrusting device 26 and the scoop 14 is continued until no more scrap remains in the compartment 11, or until a sufficient amount of scrap has been delivered to the furnace 1. The car is then re-loaded or placed in front of another charging opening, as the case may be.

In the above manner it is possible to charge an open-hearth furnace with relatively light scrap metal at a very high rate, which it has been impossible to attain with methods and apparatus heretofore in use.

It will be noted from the drawing that the vertical end 15 of the scoop is positioned at an angle of a little more than 90 degrees with the bottom of the scoop 14, so that when that end of the scoop 14 is rested upon a block 51 supported upon the floor plate 21, the end 15 of the scoop 14 is caused to assume a substantially vertical position, as shown.

Any small amounts of scrap remaining in the recessed portion 13 after the scoop 14 has been conveyed into the furnace are readily discharged through the open space 23 between the floor plates 21 and 22.

When it is desired to replace the scoop 14 with another scoop, the scoop 14 is readily removed by moving it laterally through a suitable opening 52 in the adjacent end wall 24 of the car 6.

While I have described my invention hereinabove with reference to a specific embodiment thereof by way of illustration, it will be obvious to those skilled in the art that it is susceptible of considerable modification in detail without departure from the essential teaching of my invention.

Thus, the specific form of the thrusting device may be varied, as for example by adapting it to move about an axis or in a more or less curved path, and other modifications of generally similar scope are possible.

My invention is not therefore, limited to the specific details of the illustrative example hereinabove set forth and described, but may variously be embodied within the scope of the claims hereinafter made.

I claim as my invention:

1. Apparatus for charging an open-hearth furnace, which comprises, in combination, a car adapted to be positioned in front of the charging door of the furnace, having a recessed portion adapted to receive a charging box and having an opening at one end thereof for passing said charging box into the furnace, and a movable arm located in said recessed portion above said charging box, and means for reciprocating said arm to thrust excess material lying in said recessed portion through said opening into the furnace.

2. Apparatus for charging an open-hearth furnace, which comprises, in combination, a car adapted to be positioned in front of the charging door of the furnace, having a recessed portion adapted to receive a charging box and having an opening at one end thereof for passing said charging box into the furnace, a conveyor carried by said car for supplying said recessed portion with material to be charged into the furnace, a movable arm located in said recessed portion above said charging box, and means for reciprocating said arm to thrust excess material lying in said recessed portion through said opening into the furnace.

3. Apparatus for charging an open-hearth furnace, which comprises, in combination, a car adapted to be positioned in front of the charging door of the furnace, having a recessed portion adapted to receive a charging box and having an opening at one end thereof for passing said charging box into the furnace, an arm positioned in said recess above said charging box, and means for reciprocally moving said arm toward said furnace for thrusting excess material into the furnace, and away from the furnace to withdraw the arm to a position above and clear of said charging box.

4. Apparatus for charging an open-hearth furnace, which comprises, in combination, a car adapted to be positioned in front of the charging door of the furnace, having a recessed portion adapted to receive a charging box and having an opening at one end thereof for passing said charging box into the furnace, a spout located in said opening, and a movable arm located in said recessed portion above said charging box, and means for reciprocating said arm to thrust excess material lying in said recessed portion through said opening into the furnace.

5. Apparatus for charging an open-hearth furnace, which comprises, in combination, a car adapted to be positioned in front of the charging door of the furnace, having a recessed portion adapted to receive a charging box and having an opening at one end thereof for passing said charging box into the furnace, a movable spout located in said opening and adapted to be moved relative thereto to engage the charging opening of the furnace, and a movable arm located in said recessed portion above said charging box, and means for reciprocating said arm to thrust excess material lying in said recessed portion through said opening into the furnace.

6. Apparatus for charging an open-hearth furnace, which comprises, in combination, a car adapted to the positioned in front of the charging door of the furnace, having a recessed portion adapted to receive a charging box and having an opening at one end thereof for passing said charging box into the furnace, a rack positioned at an angle with the horizontal along one side of said recess and having an extension lying within said recess, a gear in engagement therewith, and motive means for rotating said gear to reciprocally move said rack and extension toward and away from said opening, respectively.

FOLKE W. SUNDBLAD.